US008509581B2

(12) United States Patent
Winzer et al.

(10) Patent No.: US 8,509,581 B2
(45) Date of Patent: Aug. 13, 2013

(54) OPTICAL FIBERS WITH TUBULAR OPTICAL CORES

(75) Inventors: Peter J. Winzer, Aberdeen, NJ (US); Christopher Richard Doerr, Middletown, NJ (US)

(73) Assignee: Alcatel Lucent, Paris (FR)

( * ) Notice: Subject to any disclaimer, the term of this patent is extended or adjusted under 35 U.S.C. 154(b) by 197 days.

(21) Appl. No.: 13/077,149

(22) Filed: Mar. 31, 2011

(65) Prior Publication Data
US 2012/0251126 A1 Oct. 4, 2012

Related U.S. Application Data

(60) Provisional application No. 61/464,476, filed on Mar. 5, 2011.

(51) Int. Cl.
*G02B 6/02* (2006.01)
*H04B 10/12* (2011.01)

(52) U.S. Cl.
USPC ............ 385/124; 385/27; 385/28; 385/122; 385/123; 385/125; 385/126; 385/127; 385/128; 398/141

(58) Field of Classification Search
USPC ...................... 385/27–28, 122–128
See application file for complete search history.

(56) References Cited

U.S. PATENT DOCUMENTS

| | | | |
|---|---|---|---|
| 6,535,678 B1 * | 3/2003 | Yamauchi et al. | 385/123 |
| 6,594,429 B1 * | 7/2003 | White | 385/124 |
| 6,782,148 B2 * | 8/2004 | Eggleton et al. | 385/11 |
| 7,317,857 B2 * | 1/2008 | Manyam et al. | 385/127 |
| 7,424,195 B2 * | 9/2008 | Andrieu et al. | 385/126 |
| 2003/0174985 A1 | 9/2003 | Eggleton et al. | |
| 2008/0142828 A1 | 6/2008 | Yang | |
| 2010/0329670 A1 | 12/2010 | Essiambre | |
| 2010/0329671 A1 | 12/2010 | Essiambre | |

OTHER PUBLICATIONS

Chen, Xia et al., "Polarization-Independent Grating Couplers for Silicon-on-Insulator Nanophotonic Waveguides", Optics Letters, Feb. 8, 2011, 4 pages.
Mekis, Attila, et al., "A Grating-Coupler-Enabled CMOS Photonics Platform", IEEE Journal of Selected Topics in Quantum Electronics, vol. 17, No. 3, Nov. 29, 2010, 12 pages.
Gloge, D. et al., "Impulse Response of Fibers With Ring-Shaped Parabolic Index Distribution", Bell System Tech. J., vol. 52, No. 7, Sep. 1973, pp. 1161-1168.
Kogelnik, H., "Theory of Optical Waveguides", Guided-Wave Optoelectronics, Springer-Verlag, Berlin, 1990, pp. 12-17.

(Continued)

*Primary Examiner* — Brian Healy
*Assistant Examiner* — Guy Anderson
(74) *Attorney, Agent, or Firm* — John F. McCabe

(57) ABSTRACT

An embodiment of an apparatus includes an optical fiber for which a complete orthogonal basis of propagating modes at an optical telecommunication frequency includes ones of the propagating modes with different angular momenta. The optical fiber has a tubular optical core and an outer optical cladding in contact with and surrounding the tubular optical core. The tubular optical core has a larger refractive index than the optical cladding. The tubular optical core is configured such that those of the propagating modes whose angular momenta have the lowest magnitude for the propagating modes have substantially the same radial intensity profile.

22 Claims, 11 Drawing Sheets

(56) References Cited

OTHER PUBLICATIONS

Lee, B. G. et al., "120-Gb/s 100-m Transmission in a Single Multicore Multimode Fiber Containing Six Cores Interfaced with a Matching VCSEL Array", Photonics Society Summer Topical Meeting Series, Jul. 19-21, 2010 IEEE, TuD4.4, 16.30-16.45, pp. 223-224.

Winzer, Peter J. et al., U.S. Appl. No. 13/076,917, filed Mar. 31, 2011, "Multi-Core Optical Fiber and Optical Communication Systems," 22 pages.

Doerr, Christopher R., U.S. Appl. No. 13/041,366, filed Mar. 5, 2011, "Radial Optical Coupler," 44 pages.

Doerr, Christopher R., U.S. Appl. No. 13/041,364, filed Mar. 5, 2011, "Polarization-Independent Grating Optical Coupler," 40 pages.

Ryf, R. et al., "Space-division multiplexing over 10 km of three-mode fiber using coherent 6×6 MIMO processing", Optical Fiber Communication Conference (OFC), Post deadline paper PDPB10, Mar. 8, 2011, OSA/OFC/NFOEC 2011, 3 pgs.

Doerr, Christopher R. et al., "Circular grating coupler for creating focused azimuthally and radially polarized beams", Optics Letters, vol. 36, No. 7, Apr. 1, 2011, pp. 1209-1211.

Dorn, R. et al., "Sharper Focus for a Radially Polarized Light Beam", Physical Review Letters, vol. 91, No. 23, Dec. 5, 2003, pp. 233901-1-233901-4.

Gupta, Devki Nandan, et al., "Electron Acceleration to GeV energy by a radially polarized laser", Physics Letters A, 368, 2007, pp. 402-407.

Ibanescu, M., et al., "An All-Dielectric Coaxial Waveguide", Science, vol. 289, Jul. 21, 2000, pp. 415-419.

Kogelnik, H., et al, "Laser Beams and Resonators", Proceedings of the IEEE, vol. 54, No. 10, Oct. 1966, pp. 1312-1329.

Passilly, Nicolas, et al, "Simple interferometric technique for generation of a radially polarized light beam", J. Opt. Soc. Am. A, vol. 22, No. 5, May 2005, pp. 984-991.

Mushiake, Y., et al, "Generation of Radially Polarized Optical Beam Mode by Laser Oscillation", Proceedings of the IEEE, 60, Sep. 1972, pp. 1107-1109.

Jordan, Rebecca H., et al, "Lasing behavior of circular grating surface-emitting semiconductor lasers", J. Opt. Am. B, vol. 14, No. 2, Feb. 1997, pp. 449-453.

Miyai, E., et al, "Lasers producing tailored beams", Nature, vol. 441, Jun. 22, 2006, p. 946.

Noda, Susumu, et al, "Polarization Mode Control of Two-Dimensional Photonic Crystal Laser by Unit Cell Structure Design", Science, vol. 293, Aug. 10, 2001, pp. 1123-1125.

Doerr, Christopher R., "360 Star Coupler for Detecting Subwavelength Features", IEEE Photonics Technology Letters, vol. 20, No. 17, Sep. 1, 2008, pp. 1440-1442.

Dragone, C., "Optimum design of a planar array of tapered waveguides", J. Opt. Soc. Am. A, vol. 7, No. 11, Nov. 1990, pp. 2081-2093.

Curtis, Jennifer E., et al, "Dynamic Holographic Optical Tweezers", Opt. Commun., 207, Apr. 17, 2002, p. 169 et seq.

Kitamura, Kyoko, et al, "Sub-wavelength focal spot with long depth of focus generated by radially polarized, narrow-width annular beam", Optics Express, vol. 18, No. 5, Mar. 1, 2010, pp. 4518-4525.

Zurita-Sanchez, Jorge R., et al, "Multipolar interband absorption in a semiconductor quantum dot. II. Magnetic dipole enhancement", J. Opt. Soc. Am. B, vol. 19, No. 11, Nov. 2002, pp. 2722-2726.

Loudon, R., The Quantum Theory of Light (Oxford University, 1973), Chapter 8, pp. 172-173.

Doerr, Christopher R., et al, U.S. Appl. No. 13/012,712, filed Jan. 24, 2011, "Core-Selective Optical Switches," 46 pages.

Essiambre, Rene-Jean, et al, U.S. Appl. No. 12/827,641, filed Jun. 30, 2010, "Multimode-Optical Communication", 46 pages.

Dragone, C., "Efficient N×N Star Coupler Based on Fourier Optics", Electronics Letters, vol. 24, No. 15, Jul. 1988, pp. 942-944.

Whitesides, George M., "The origins and the future of microfluidics", Nature, vol. 442, Jul. 27, 2006, pp. 368-373.

Zurita-Sanchez, Jorge R., et al, "Multipolar interband absorption in a semiconductor quantum dot. I. Electric quadrupole enhancement", J. Opt. Soc. Am. B, vol. 19, No. 6, Jun. 2002, pp. 1355-1362.

PCT International Search Report, PCT/US2012/025344, International filed Feb. 16, 2012, Date of Mailing Search Report Jan. 21, 2013, 3 pgs.

Patent Abstracts of Japan, Publication No. 09-218318, published Aug. 19, 1997, 1 pg.

* cited by examiner

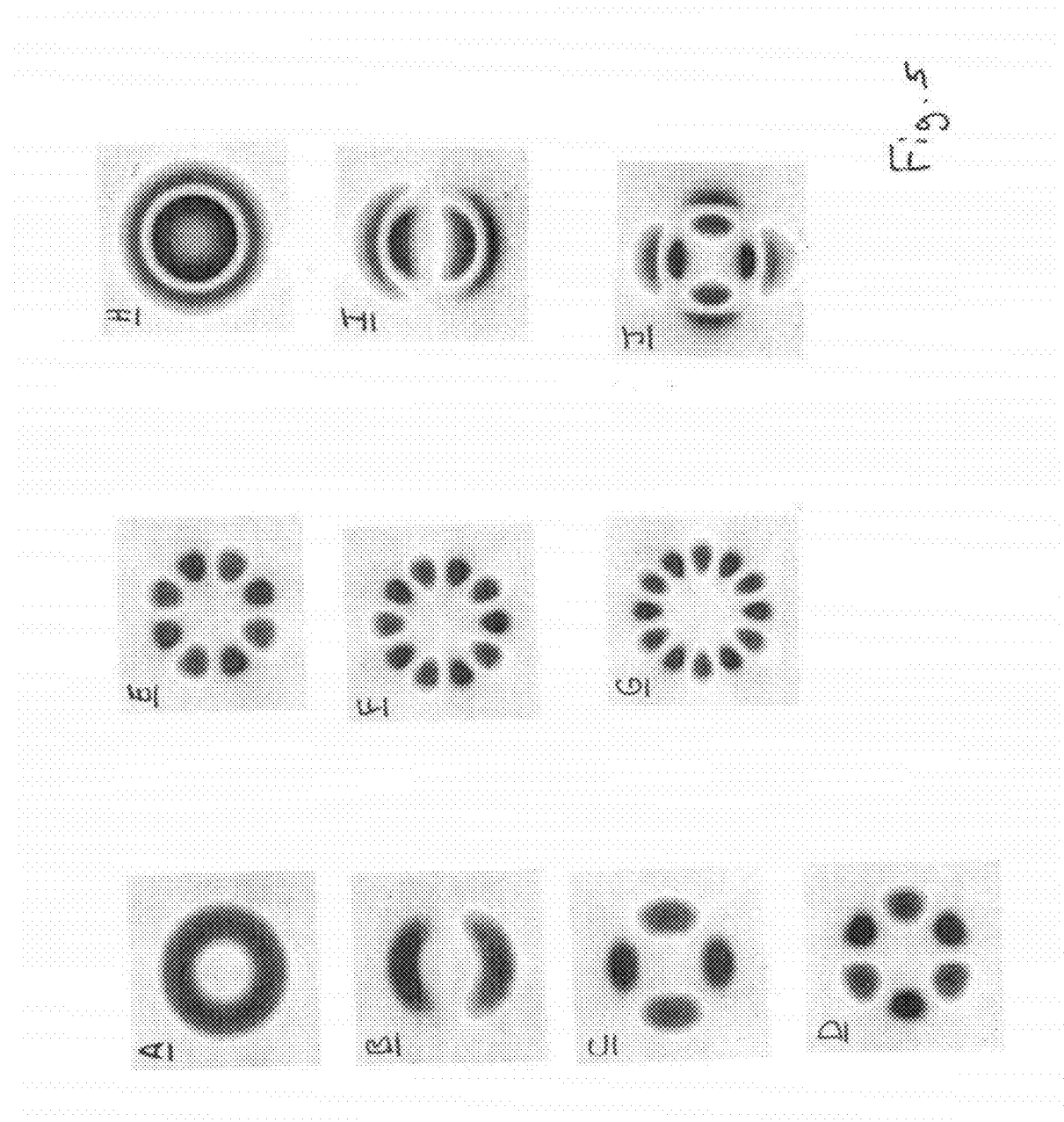

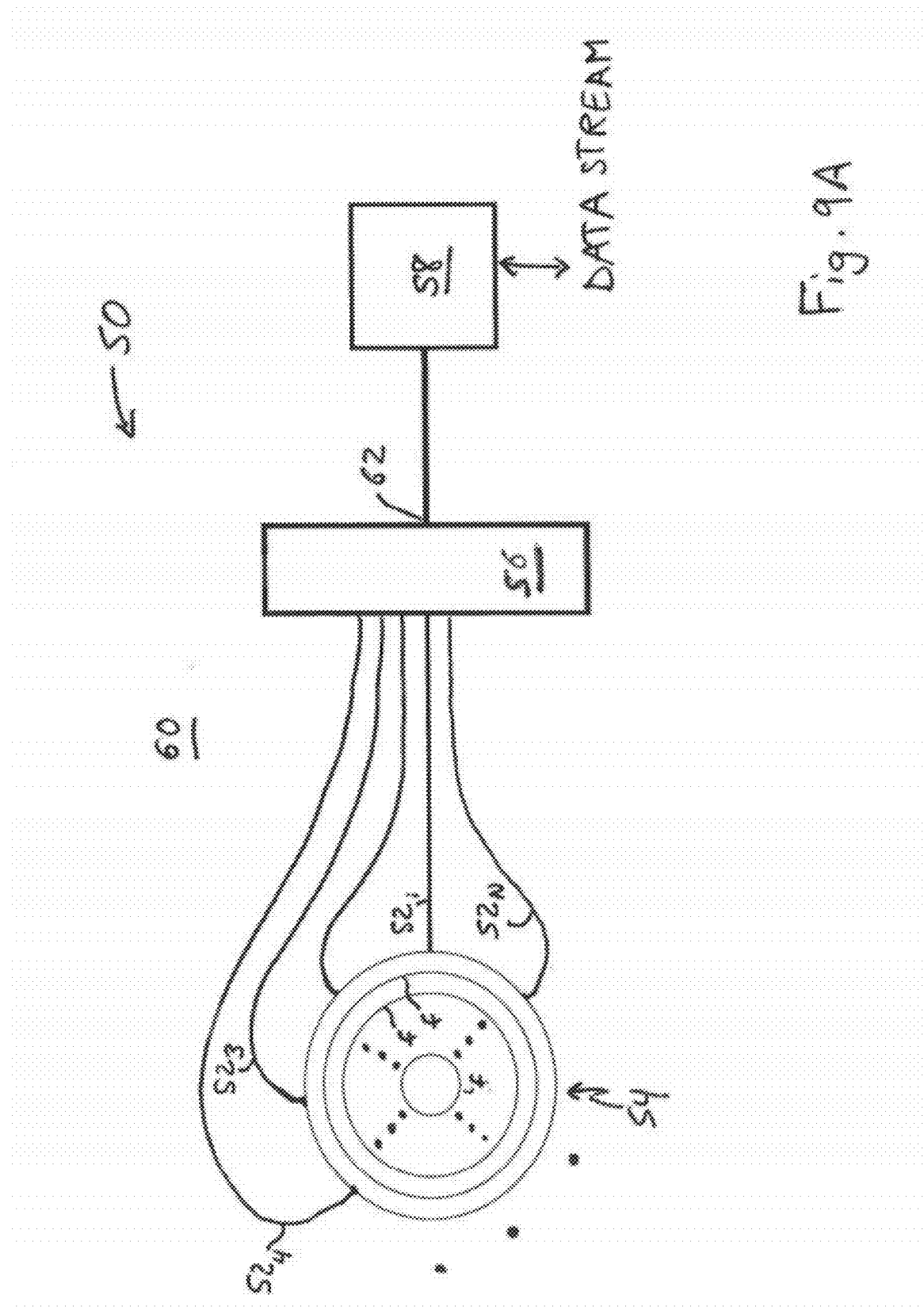

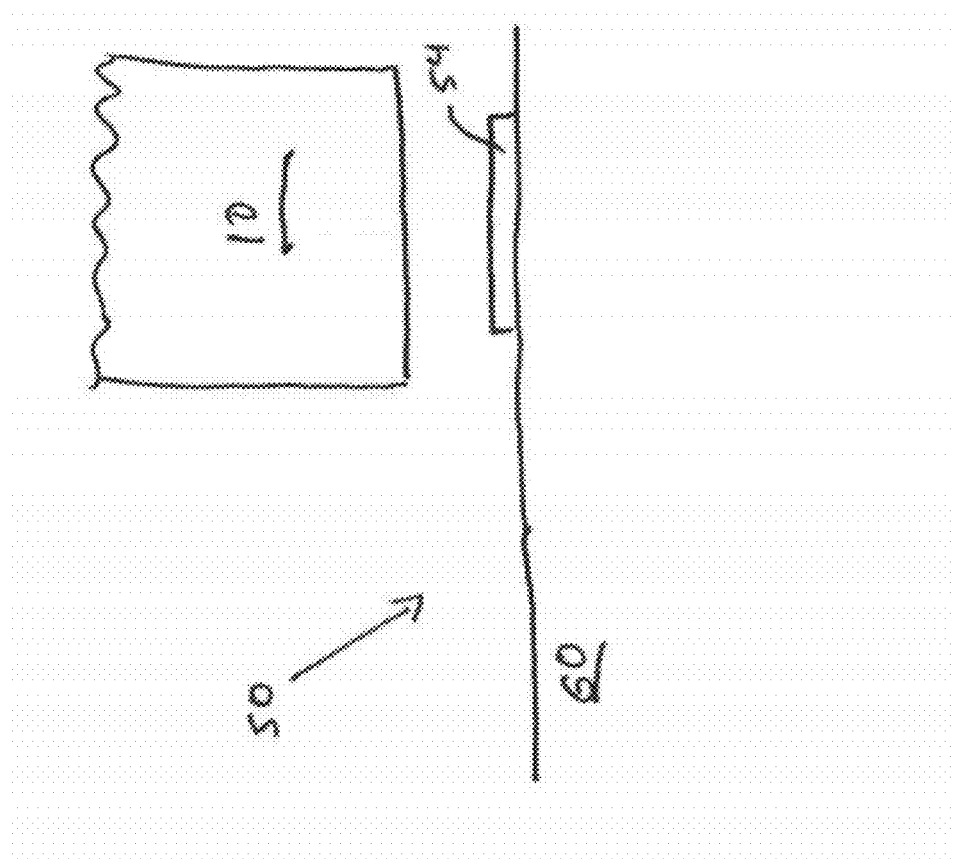

OPTICAL FIBERS WITH TUBULAR OPTICAL CORES

This application claims the benefit of U.S. provisional application 61/464,476, which was filed on Mar. 5, 2011.

BACKGROUND

1. Technical Field

The inventions relate to optical fibers and methods for making and using optical fibers.

2. Discussion of the Related Art

This section introduces aspects that may be helpful to facilitating a better understanding of the inventions. Accordingly, the statements of this section are to be read in this light and are not to be understood as admissions about what is in the prior art or what is not in the prior art.

In an optical communication system, a series of one or more spans of optical fiber typically carries data from an optical transmitter to an optical receiver. The optical fiber may be fabricated to have one or multiple propagation modes for light having a wavelength in ordinary optical fiber telecommunication bands, e.g., the C-band or the L-band. In a multi-mode optical fiber, multiple propagation modes are available, and each of the propagation modes may carry a different data stream or a linear combination of different data streams. Thus, a multi-mode optical fiber may be able to support a larger data transmission rate in a given frequency band than a single-mode optical fiber.

BRIEF SUMMARY

An embodiment of a first apparatus includes an optical fiber for which a complete orthonormal basis of propagating modes at an optical telecommunication frequency includes ones of the propagating modes with different angular momenta. The optical fiber has a tubular optical core and an outer optical cladding in contact with and surrounding the tubular optical core. The tubular optical core has a larger refractive index than the optical cladding. The tubular optical core is configured such that those of the propagating modes with angular momenta of the lowest magnitude have a single group velocity, those of the propagating modes with angular momenta of the second lowest magnitude have a single group velocity, and those of the propagating modes with angular momenta of the third lowest magnitude have a single group velocity.

In some embodiments, the first apparatus may further include an inner optical cladding filling the tubular optical core and having a refractive index smaller than the refractive index of the tubular optical core.

In any of the embodiments of the first apparatus, the tubular optical core may have a refractive index that radially varies over the tubular optical core.

In any of the above embodiments of the first apparatus, the tubular optical core may be configured so that for each specific magnitude of the angular momenta, those propagating modes with angular momenta of the specific magnitude have the same group velocity.

In any of the above embodiments of the first apparatus, the first apparatus may include an optical splitter or combiner optically connecting an optical first port thereof to N optical second ports thereof, a planar optical grating, and N optical waveguides. Then, each optical waveguide has a first end located near and optically connecting to a corresponding one of the optical second ports and has a second end located near the planar optical grating. Then, the planar optical grating is configured to diffract light between an adjacent end of the optical fiber and the second ends of the optical waveguides. In some such embodiments, the optical first port may substantially only optically couple to some of the propagating modes, wherein the some of the propagating modes have angular momenta of the same value. In some such embodiments, at least 90% of the optical power communicated between the optical first port and the optical fiber is communicated between the optical first port and the some of the propagating modes.

A second apparatus includes an optical fiber for which a complete orthonormal basis of propagating modes at an optical telecommunication frequency includes ones of the propagating modes with different angular momenta. The optical fiber has a tubular optical core and an outer optical cladding in contact with and surrounding the tubular optical core. The tubular optical core has a larger refractive index than the optical cladding. The tubular optical core is configured such that those of the propagating modes whose angular momenta have the lowest magnitude for the propagating modes have substantially the same radial intensity profile.

In some embodiments of the second apparatus, the magnitudes of the angular momenta may include two or more different values. Then, the tubular optical core may be configured such that those of the propagating modes with one of the angular momenta of the second lowest of the magnitudes have substantially the same radial intensity profile. In some such embodiments, the tubular optical core may be configured such that those of the propagating modes with one of the angular momenta of the third lowest of the magnitudes have substantially the same radial intensity profile.

In any of the embodiments of the second apparatus, the second apparatus may include an inner optical cladding that fills the tubular optical core and has a refractive index smaller than the refractive index of the tubular optical core. In some such embodiments, the inner cladding may contain other structures, such as another optical core, e.g., a solid optical core.

In any of the embodiments of the second apparatus, the magnitudes of the angular momenta may include two or more different values, and the tubular optical core may be configured such that for each particular one of the values, those of the propagating modes whose angular momenta have magnitudes of the particular one of the values have substantially the same radial intensity profile.

In any of the embodiments of the second apparatus, the tubular core may have an average refractive index $n_c$, and the refractive index of the optical cladding may have a value $n_{OC}$. Then, the value of the outer radius of the tubular optical core minus the inner radius of the tubular optical core may be less than a wavelength in the optical fiber telecommunication L-band over $[2([n_c]^2-[n_{OC}]^2)^{1/2}]$.

In any of the embodiments of the second apparatus, the second apparatus may further include an optical splitter or combiner optically connecting an optical first port thereof to N optical second ports thereof, a planar optical grating, and N optical waveguides. In such embodiments, each optical waveguide has a first end located near and optically connecting to a corresponding one of the optical second ports and has a second end located near the planar optical grating, and the planar optical grating is able to diffract light between an end of the optical fiber and the second ends of the optical waveguides. In some such embodiments, the optical first port may substantially only optically couple to some of the propagating modes having angular momenta of the same value. In some such embodiments, about 90% or more of the optical power communicated between the optical first port and the optical fiber may be communicated between the optical first port and the some of the propagating modes. Such embodiments may further include an optical data modulator or demodulator configured either to demodulate a digital data stream from a modulated light beam received from the optical first port or to modulate an optical carrier with a digital data stream and transmit the modulated optical carrier to the optical first port.

A third apparatus includes a multi-mode optical fiber having a tubular optical core and an outer optical cladding in contact with and surrounding the tubular optical core. The tubular optical core has a larger refractive index than the optical cladding. The tubular core has an average refractive index $n_c$, and the refractive index of the optical cladding has a value $n_{OC}$. The value of the outer radius of the tubular optical core minus the inner radius of the tubular optical core may be less than a wavelength (in free space) in the optical fiber telecommunication L-band divided by $[2([n_c]^2-[n_{OC}]^2)^{1/2}]$.

Some embodiments of the third apparatus may further include an optical splitter or combiner optically connecting an optical first port thereof to N optical second ports thereof, a planar optical grating, and N optical waveguides. Then, each optical waveguide has a first end located near and connected to a corresponding one of the optical second ports and has a second end located near the planar optical grating. The planar optical grating may be configured to diffract light between an adjacent end of the multi-mode optical fiber and the second ends of the optical waveguides. In some such embodiments, a complete orthogonal basis of propagating modes of the multi-mode optical fiber at an optical telecommunication frequency includes ones of the propagating modes with different angular momenta. Then, the optical waveguides may be constructed such that the optical first port substantially only optically couples to some of the propagating modes, wherein the some of the propagating modes have angular momenta of the same value.

BRIEF DESCRIPTION OF THE DRAWINGS

FIG. 5 schematically illustrates profiles of the electric field's magnitude for the propagating modes of an example of the optical fiber with a tubular core as illustrated in FIG. 1;

FIG. 9A is a block diagram schematically illustrating an apparatus that includes an optical coupler for end-coupling to a multi-mode optical fiber, e.g., the optical fiber of FIG. 1;

FIG. 9B is a side view illustrating a relative configuration for the optical coupler and the multi-mode optical fiber of FIG. 9A.

In the Figures and text, like reference symbols indicate elements with similar or the same function and/or similar or the same structure.

In the Figures, relative dimension(s) of some feature(s) may be exaggerated to more clearly illustrate the feature(s) and/or relation(s) to other feature(s) therein.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

The present application incorporates by reference herein, in their entirety, U.S. patent application Ser. No. 13/041,366, which was filed on Mar. 5, 2011 and U.S. patent application Ser. No. 13/041,366, which was filed on Mar. 5, 2011.

Figure 1:
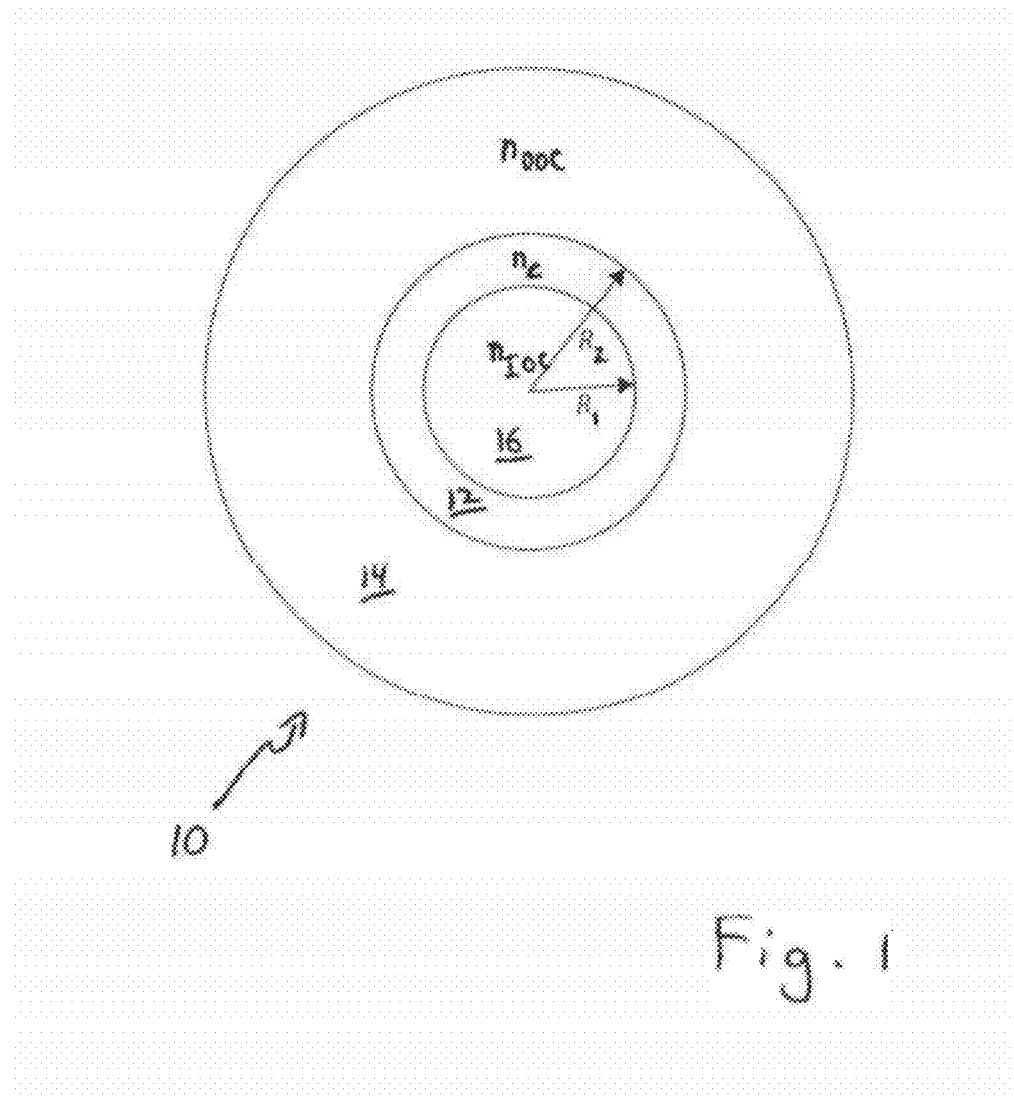
FIG. 1 is a cross-sectional view of a multi-mode optical fiber with a tubular optical core.

FIG. 1 illustrates a multi-mode optical fiber 10. The multi-mode optical fiber 10 includes a tubular optical core 12 and an outer optical cladding 14, which surrounds and is in contact with the tubular optical core 12. The tubular optical core 12 has a ring-shaped cross-section. The refractive index, $n_C$, in the tubular optical core 12 is larger than the refractive index, $n_{OOC}$, in the outer optical cladding 14, i.e., $n_C > n_{OOC}$.

In some embodiments, the multi-mode optical fiber 10 also includes an optional inner optical cladding 16 that fills the interior of the tubular optical core 12. Such an optional inner optical cladding 16 has an refractive index, $n_{OC}$, that is smaller than the refractive index, $n_C$, in the tubular optical core 12, i.e., $n_C > n_{IOC}$.

FIGS. 2A-2C, 3A-3C, and 4A-4C illustrate some examples of different radial profiles that may be used for the refractive index (RI) in the optical fiber 10 of FIG. 1. In the radial profiles, the radial distance is in the range $[0, R_1)$ for the inner optical cladding 16, is in the range $[R_1, R_2]$ for the tubular optical core 12, and is greater than $R_2$ for the outer optical cladding 14. Herein, radial distances are recited from the axis of an optical fiber, e.g., the multi-mode optical fiber 10.

Figure 2A:
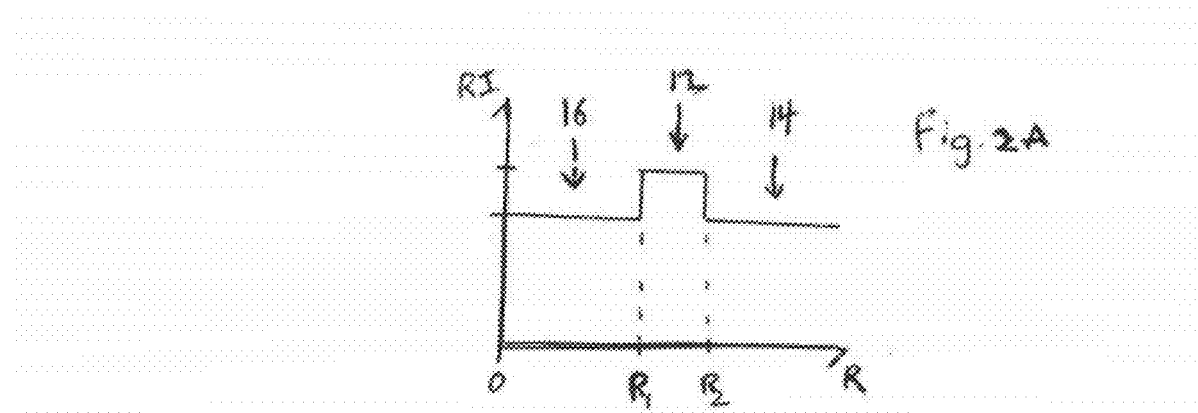
FIGS. 2A-2C show radial profiles of the refractive index for examples of the optical fiber of FIG. 1 for which the refractive index is constant in the tubular optical core.
Figure 2B:
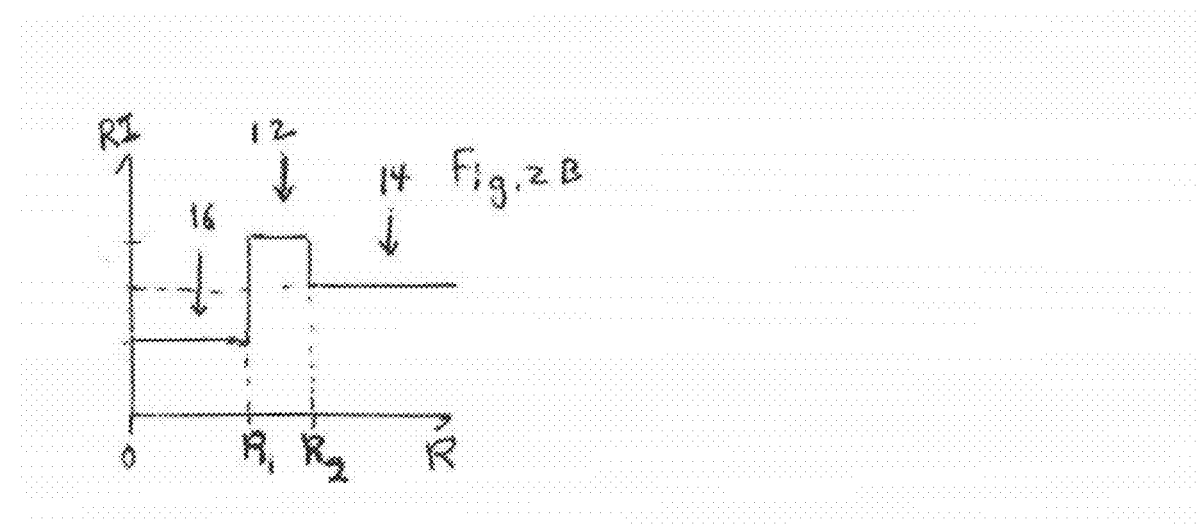
Figure 2C:
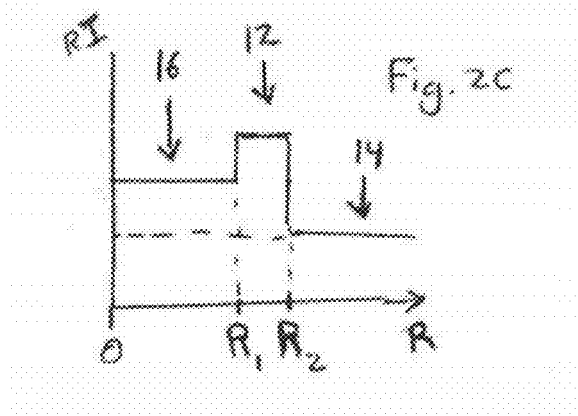
Figure 3A:
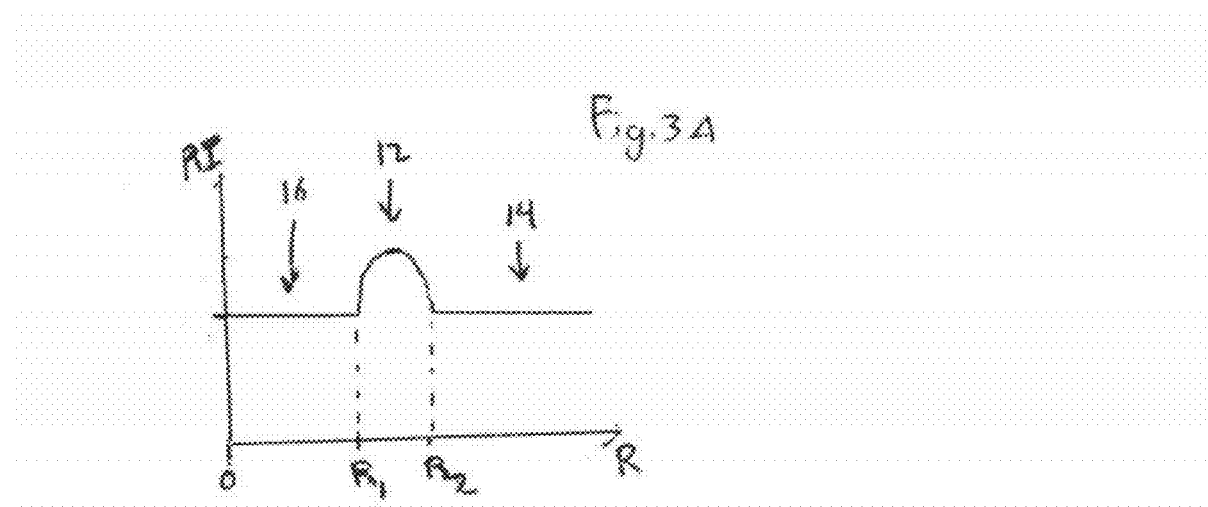
FIGS. 3A-3C show radial profiles of the refractive index for examples of the optical fiber of FIG. 1 for which the radial profile is parabolic in the tubular optical core.
Figure 3B:
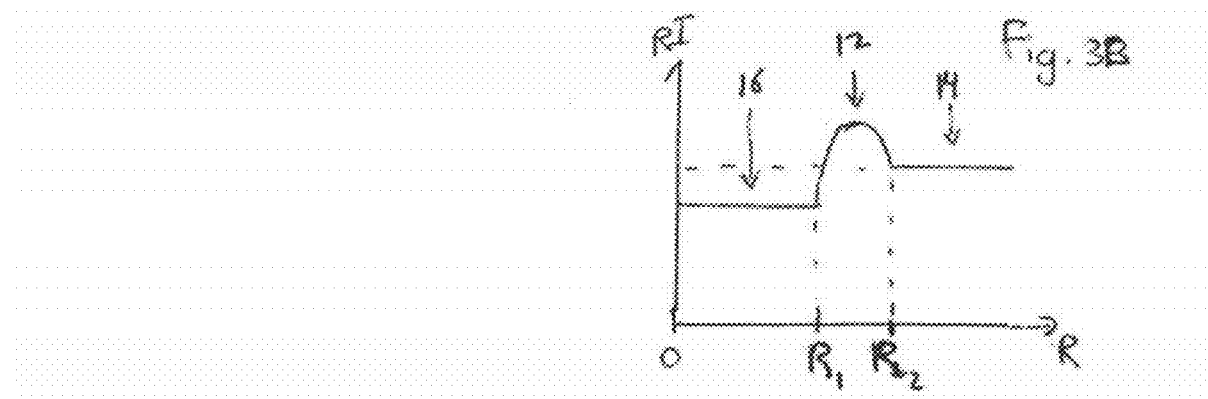
Figure 3C:
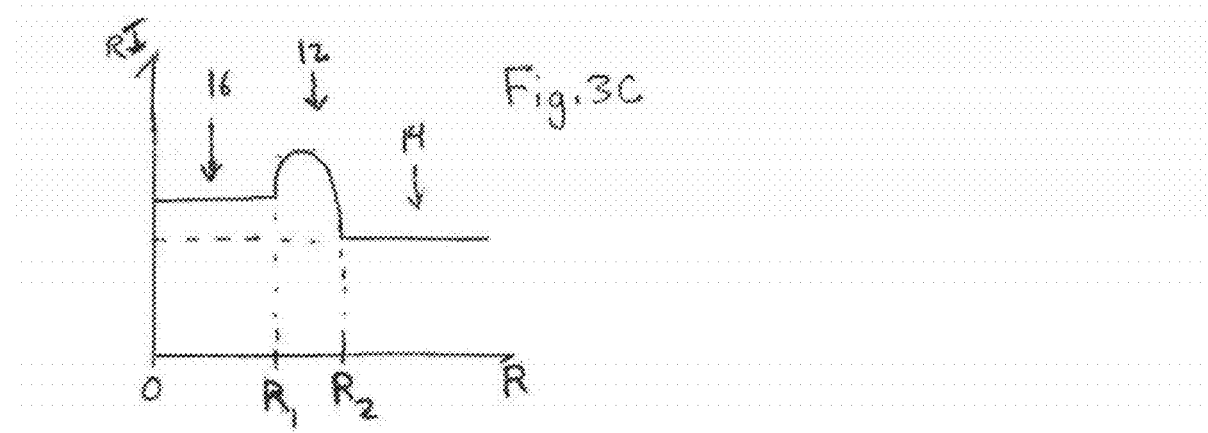
Figure 4A:
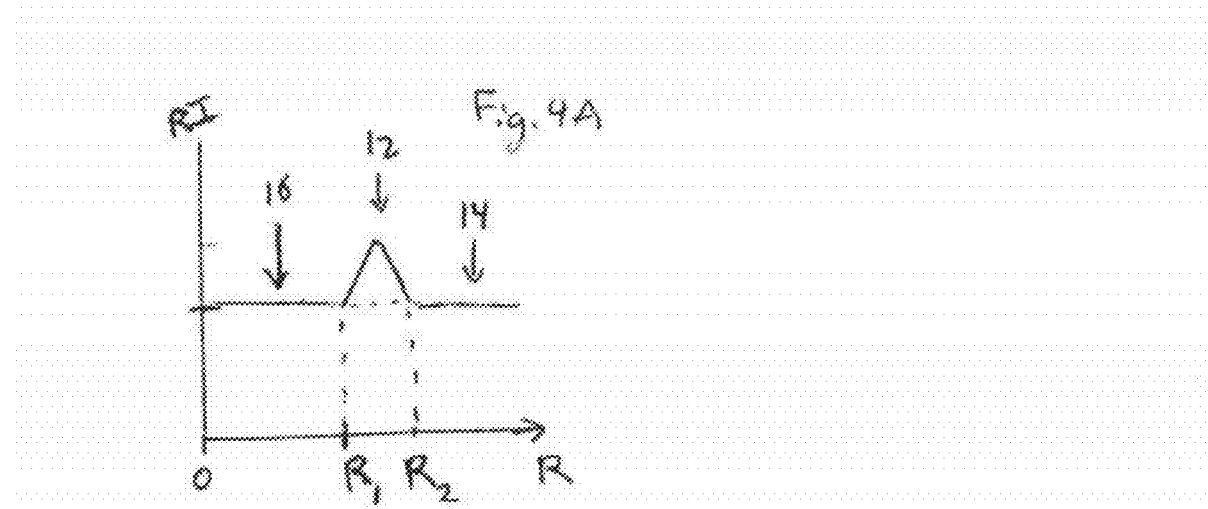
FIGS. 4A-4C show radial profiles of the refractive index for examples of the optical fiber of FIG. 1 for which the radial profile that is piecewise linear in the tubular optical core.
Figure 4B:
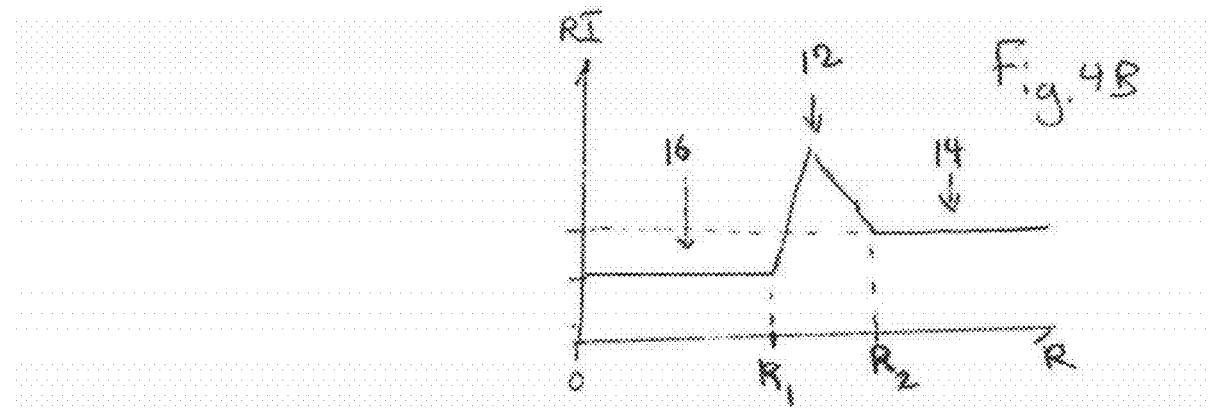
Figure 4C:
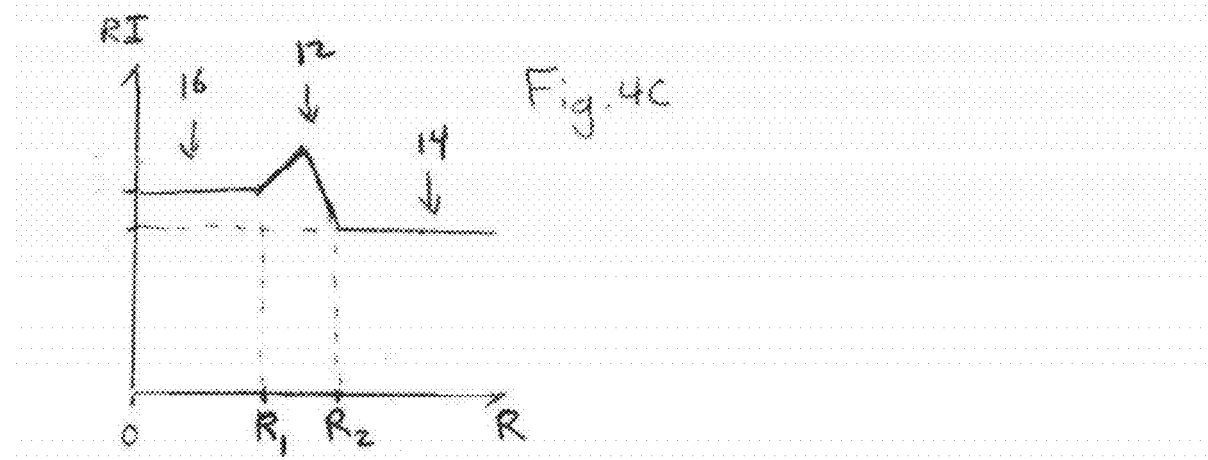

The tubular optical core 12 may have a refractive index, $n_C$, with various dependencies on radial distance, R, from the axis of the optical fiber 10. For example, the refractive index, $n_C$, in the tubular optical core 12 may be radially constant as illustrated in FIGS. 2A-2C, may radially vary parabolically therein as illustrated in FIGS. 3A-3C, or may vary radially in a piecewise linear manner as illustrated in FIGS. 4A-4C.

The refractive indexes of the inner and outer optical claddings 16, 14 may have various relationships. The refractive index may be equal in the inner and outer optical claddings 16, 14 as illustrated in FIGS. 2A, 3A, and 4A. Alternately, the refractive index of the inner optical cladding 16 may be smaller than the refractive index of the outer optical cladding 14 as illustrated in FIGS. 2B, 3B, and 4B. In FIGS. 2B, 3B, and 4C, the tubular optical core 12 may, e.g., surround an empty or filled region 16. Alternately, the refractive index of the inner optical cladding 16 may be larger than the refractive index of the outer optical cladding 14 as illustrated in FIGS. 2C, 3C, and 4C.

The tubular optical core 12, the outer optical cladding 14, and the optional inner optical cladding 16 may be made of various types of glasses, e.g., conventional doped or undoped silica glasses, substantially transparent polymers, or calcogenide glasses. For example, the tubular optical core 12 and the optical cladding(s) 14, 16 may be formed of silica or calcogenide glasses, or the tubular optical core 12 may be formed of silica or calcogenide glass, and one or both of the outer and inner optical claddings 14, 16 may be formed of substantially transparent polymer.

Due to the axial symmetry of the refractive index profile about the optical fiber's, the optical fiber 10 has a simple set of propagating modes that are mutually orthogonal, normalized, and form a complete basis at a frequency, to, e.g., a frequency in the optical fiber telecommunication C-band or L-band. In the simple basis, each of the propagating modes has an electric field, E(R, z, φ, t), e.g., of the form: $Re[E_{[\omega, m]}(R) \exp(i \cdot k \cdot z + i \cdot m \cdot \phi + i \cdot \omega \cdot t)]$, and a magnetic field H(R, z, φ, t), e.g., of the form: $Re[H_{[\omega, m]}(R) \exp(i \cdot k \cdot z + i \cdot m \cdot \phi + i \cdot \omega \cdot t)]$ where Re[A] is the real part of the vector A. Here, R, z, and φ are a set of cylindrical coordinates that defines the radial distance from the optical fiber's axis, longitudinal distance along the optical fiber's axis, and angular direction around the optical fiber's axis, respectively. In each propagating mode, k is the mode's wave number, and m is the mode's angular momentum. The angular momentum, m is the eigenvalue of the mode's angular eigenfunction, exp(i·m·φ), under the action of the angular momentum operator $$\frac{-i\partial}{\partial \varphi}.$$

Herein, the angular momentum of a mode is defined with respect to the center of the optical core around which the power of the mode is localized, and the outer surface of the outer optical cladding 14 may not be radial symmetric about the tubular optical core 12 if the power density of the propagating modes are very small on that surface. The radial functions $E_{[\omega, m]}(R)$ and $H_{[\omega, m]}(R)$ defined the dependencies of the mode's E and H fields on the radial distance, R, from the axis of the multi-mode optical fiber 10. Independence of an optical fiber's refractive index on both the longitudinal coordinate in the optical fiber, i.e., coordinate z, and the angular coordinate in the optical fiber, i.e., coordinate φ, leads to the above-described special eigenfunctions for the electric and magnetic fields E, H for the propagating modes of the simple basis.

Figure 6:
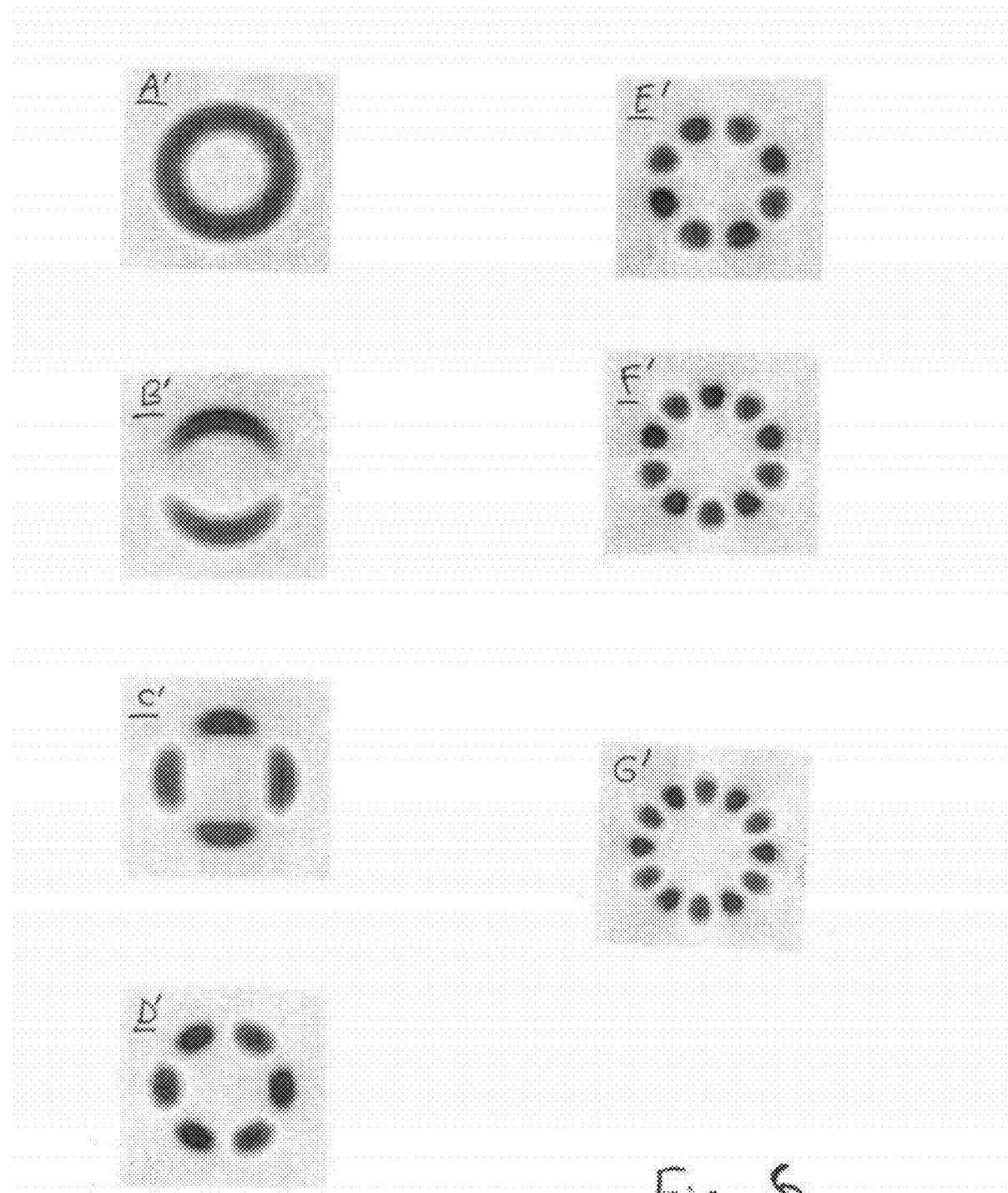
FIG. 6 schematically illustrates profiles of the electric field's magnitude for the propagating modes in another example of the optical fiber with a tubular core as illustrated in FIG. 1.

Plates A-J of FIG. 5 and plates A'-G' of FIG. 6 schematically illustrate calculated cross-sectional profiles for the electric field's magnitude of the propagating modes of the simple basis in respective first and second examples of the multi-mode optical fiber 10. In each plate A-J and A'-G', darker areas indicate regions where the propagating mode has an electric field of larger magnitude.

In these first and second examples of the multi-mode optical fiber 10, the sizes of the tubular optical cores 12 differ. In the first example, the inner radius, $R_1$, of the tubular optical core 12 is smaller than, in the second example. A comparison of the profiles for propagating modes of these two examples of the multi-mode optical fiber 10 may illustrate some qualitative aspects of how the special basis of propagating modes changes with the inner width of the tubular core 12.

From the plates A-J and A'-G' of FIGS. 5 and 6, it is possible to guess the angular momentum eigenvalues, m, of the corresponding propagating modes. In particular, a mode with an angular momentum eigenvalue of magnitude |m| will have zeros in its electric field along 2|m| azimuthal directions about the axis of the optical fiber 10.

Based on this rule, the plates A, B, C, D, E, F, G, H, I, and J of FIG. 5 illustrate the cross-sectional profiles of propagating modes whose angular momentum eigenvalues have magnitudes, |m|, of 0, 1, 2, 3, 4, 5, 6, 0, 1, and 2, respectively. The cross-sectional profiles A-I of FIG. 5 correspond to a set of 36 relatively orthogonal propagating modes. To understand the counting of the relatively orthogonal propagating modes, it is noted that there are propagating modes with locally orthogonal polarizations for each (cross-sectional profile, angular momentum eigenvalue) pair, and there are two angular momentum eigenvalues of opposite sign, i.e., +m and −m, for each nonzero angular momentum eigenvalue, m. Thus, the cross-sectional profiles in each of plates A and H correspond to 2 propagating modes, and the cross-sectional profiles in each of plates B-G and I-J correspond to 4 propagating modes.

One would typically suspect that the intensity profiles for these propagating modes would have qualitatively similar forms to the profiles for the electric field's magnitude. For that reason, FIG. 5 seems to indicate that the basis includes propagating modes with the same angular momentum eigenvalue and substantially different radial intensity profiles. In particular, two radial intensity profiles are substantially different when the two profiles have different numbers of maxima and/or minima and/or have maxima and/or minima located at different radial distances from the axis of the optical fiber. In particular, the plates A and H seem to indicate substantially different radial intensity profiles, but the same angular momentum eigenvalues, i.e., m=0; the plates B and I seem to indicate substantially different radial intensity profiles, but the same sets of angular momentum eigenvalues, i.e., m=1 and −1 for each profile; and the plates B and I seem to indicate substantially different radial intensity profiles, but the same sets of angular momentum eigenvalues for each profile, i.e., m=2, and −2. Thus, the set of propagating modes illustrated in FIG. 5 includes some multiplicities of the radial eigenfunctions, i.e., $\{E_{[\omega, m]}(R), H_{[\omega, m]}(R)\}$, for a fixed value of m that differ by more than a rotation of the local polarization. Each set of propagating modes with the same angular momentum eigenvalue includes radial intensity profiles of very different forms, e.g., substantially different radial profiles. Due to the very different radial profiles such sets of propagating modes with the same angular momentum eigenvalues would typically also have different mode velocities in the multi-mode optical fiber 10.

For the above discussed reasons, the plates A, B, C, D, E, and F of FIG. 6 seem to illustrate cross-sectional intensity profiles of propagating modes whose angular momenta have magnitudes, |m|, of 0, 1, 2, 3, 4, 5, and 6, respectively. The profiles of plates A-F of FIG. 6 would seem to correspond to a set of 26 relatively orthogonal propagating modes. In particular, two propagating modes with locally orthogonal polarizations would produce the same cross-sectional profile of the electric field's magnitude, and for each propagating mode with a nonzero angular momentum eigenvalue, there should be another mode with the opposite angular momentum eigenvalue and the same cross-sectional profile of the electric field's magnitude.

Unlike the set of propagating modes illustrated in FIG. 5, the set of propagating modes of FIG. 6 does not seem to indicate multiple propagating modes for some angular momentum eigenvalues with the exception of polarization rotations. Thus, the set of propagating modes illustrated in FIG. 6 seems to include only a single radial pair of eigenfunctions, i.e., $\{E_{[\omega, m]}(r), H_{[\omega, m]}(r)\}$, for each value of m, wherein the two radial eigenfunctions correspond to propagating modes whose polarizations differ by a rotation. Thus, FIG. 6 seems to indicate that for each value of the angular momentum eigenvalue, the corresponding complete set of orthonormalized propagating modes does not include two such modes with different or substantially different radial intensity profiles.

The observation that the bases of propagating modes, in the above-described examples of the multi-mode optical fiber 10, for which the inner radius, $R_1$, differ, have qualitatively different forms, suggests some conclusions. For tubular optical cores 12 with large enough inner radii, $R_1$, the optical fiber 10 has, at most, two relatively orthogonal optical propagating modes for each set of allowed values of (m, ω). For each pair of values (m, ω), the two orthogonal propagating modes have locally orthogonal polarizations. In particular, Maxwell's equations provide, at most, two sets of functions ($E_{[\omega, m]}(r)$, $H_{[\omega, m]}(r)$) to define the radial dependency of the electric and magnetic fields of the propagating mode for each allowed set of indices (m, ω), wherein the two fields are related by a rotation of the polarization. Indeed, the propagating modes are expected to not include multiple modes with the same (m, ω) and substantially different radial intensity profiles for sufficiently large values of the inner radius, $R_1$.

Indeed, the quasi-absence of multiple propagating modes with form the same (m, ω) and substantially different radial intensity profiles can be advantageous, i.e., up to modes with locally rotated fields. For special embodiments of the multi-mode optical fiber 10 with such a special complete orthonormal basis of propagating modes, some optical couplers can be used to substantially end-couple light into only those propagating modes of the multi-core optical fiber 10, which have a preselected angular momentum eigenvalue. In contrast, such optical couplers seem to be difficult to configure to end-couple light into examples of the multi-mode optical fiber 10 with any desired radial intensity profile. That is, in some examples of the multi-mode optical fiber, such an optical coupler could excite different propagating modes if the optical fiber 10 including propagating modes with the same angular momentum eigenvalues, i.e., the same (m, ω), and substantially different radial intensity profiles. In addition, such propagating modes would typically be expected to have different mode velocities in the optical fiber 10, i.e., even if the modes have the same (m, ω), because their different radial intensity distributions would typically differently sample the radial portions of the multi-mode optical fiber of different refractive index. Thus, such propagating modes with different radial intensity profiles would be expected to travel for different times to be transported by such an example of the multimode optical fiber 10 from a local transmitter to a remote optical receiver even when said propagating modes have the same (m, ω). In optical communications, removing interference associated with the excitation of such propagating modes of the same angular momentum eigenvalues, i.e., the same (m, ω), and substantially different radial intensity profiles would be expected to require equalization over long temporal intervals, i.e., due to the significantly different mode velocities.

Thus, some special constructions of the multi-mode optical fiber 10 seem to have a complete orthonormal basis of propagating modes in which substantially different radial intensity distributions are absent among the propagating modes with the same angular momentum eigenvalue, i.e., for some or all values of the angular moment eigenvalues. For this reason, such constructions of the multi-mode optical fiber 10 of FIG. 1 in which the tubular core 12 has such a special complete basis of propagating modes can be advantageous for end-coupling to the multi-mode optical fiber 10.

The inventors have realized that such constructions of the multi-mode optical fiber 10 of FIG. 1 are available when the frequency ω to of the propagating modes of the complete basis are in the optical fiber telecommunication C-band and/or the optical fiber telecommunication L-band. Such examples if the optical fiber 10 are believed to be available for various types of refractive index profiles, e.g., as illustrated in FIGS. 2A-2C, 3A-3C, and 4A-4C.

For example, constructions of the optical fiber 10 with the above-desired properties may made with piece wise flat radial profiles of the refractive index profile as illustrated in FIG. 2A. To make some such embodiments, the cross-sectional dimensions of the tubular optical core 12 may be constructed to satisfy:

$$R_2 - R_1 < \lambda/[2([n_c]^2 - [n_{OC}]^2)^{1/2}].$$

In the above inequality, λ is the light wavelength carried by the multi-optical fiber 10; $n_c$ is the refractive indexes of the tubular optical core 12; $n_{OC}$ is the refractive index of the optical claddings 14, 16; and $R_1$ and $R_2$ are the respective inner and outer radii of the tubular optical core 12. Such examples are expected to have the above-desired properties when $n_c/n_{OC} << 2$. In such embodiments, the inventors believe that the number, N, of orthogonal propagating modes will grow approximately in a manner proportional to the average radius of the tubular optical core 12. For example, the number, N, is believed to be approximately given by:

$$N = (4\pi/\lambda) \cdot (b[n_c^2 - n_{OC}^2])^{1/2} (R_1 + R_2) + 2.$$

In the above equation, the number "b" is the solution to the transcendental equation:

$$(2\pi/\lambda) \cdot (R_2 - R_1) \cdot (n_c^2 - n_{OC}^2)^{1/2} (1-b)^{1/2} = 2 \cdot \tan^{-1}((b/[1-b])1/2).$$

Furthermore, applicants believe that a larger average radius of the tubular optical core can reduce mode dispersion.

A specific example of the above-discussed special constructions of the multi-mode optical fiber 10 of FIGS. 1 and 2A may be made, e.g., from doped and/or undoped silica glasses. In the specific example, the tubular optical core 12 is formed of silica glass having a refractive index of (1.45)·(1.003), e.g., at an optical fiber telecommunication C-band or L-band frequency, and the outer and inner optical claddings are formed of silica glass with refractive indexes of 1.45 at the same frequency. In the specific example, the tubular optical core 12 has an inner radius R1 of about 20 micro-meters (μm) and an outer radius of about 25 μm. Also, in the specific example, the outer optical cladding 14 has, e.g., a large enough outer diameter so that substantially all optical energy of the propagating modes is confined to silica glass of the optical fiber 10.

For this specific special example of the optical fiber 10 of FIGS. 1 and 2A, the inventors have numerically evaluated the electric field profiles of some of the propagating modes. Central portions of the cross-sectional profiles of the electric field for different ones of these propagating modes are illustrated in plates A, B, C, D, E, and F of FIG. 7. In the plates A-F, the directions and magnitudes of the electric field, as projected on the cross section of the multimode optical fiber 10, are indicated by vectors, and the magnitudes of the electric field are qualitatively indicated by the darkness of the images. The plates A and B illustrate two propagating modes whose angular momentum eigenvalue, m, have the value 0 and whose polarizations are locally orthogonal. The plates C and D illustrate two propagating modes whose angular momentum eigenvalues, m, have the value +1 and whose polarizations are locally orthogonal. The plates E and F illustrate two propagating modes whose angular momentum eigenvalues, m, have the value −1 and whose polarization profiles are locally orthogonal. The set of propagating modes of the plates A-F are relatively orthogonal due either to the different values of their angular momentum eigenvalue "m" or due to the local orthogonality of their polarizations.

For a variety of radial profiles of the refractive index, the inventors believe that the multi-mode optical fiber 10 of FIG. 1 may have desirable and qualitatively different complete bases of propagating modes at frequencies in the optical fiber telecommunication C-band and/or the optical fiber telecommunication L-band. For such radial profiles of the refractive index, those propagating modes of the basis with the same angular momentum eigenvalue will have substantially the same or the same radial intensity profile and thus, will have the same mode velocities. But, for different radial refractive profiles, such desirable sets of propagating modes may exist for the angular momentum eigenvalues of the lowest magnitude; the first and second lowest magnitudes; the first, second, and third lowest magnitudes, . . . , or all magnitudes, because the form of the basis changes with the radial refractive index profile. Thus, by varying the refractive index profile, one may vary the number of angular momentum eigenvalues for which those propagating modes of a particular angular momentum eigenvalue have the same mode velocity and have substantially the same radial intensity profile.

Figure 8:
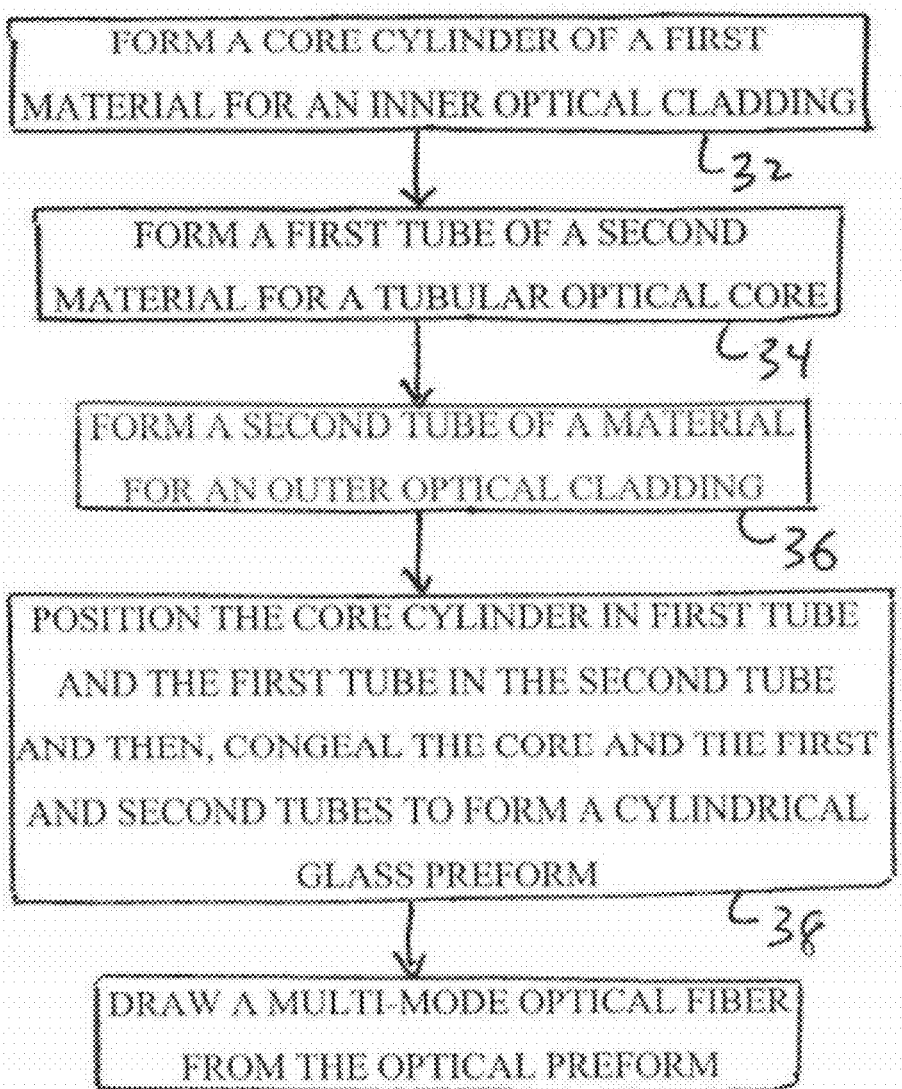
FIG. 8 is a flow chart schematically illustrating one method of making an optical fiber with a tubular optical core, e.g., the optical fiber of FIG. 1.

FIG. 8 illustrates a method 30 for constructing a multi-mode optical fiber with a tubular optical core. The multi-mode optical fiber may be one of the examples of the multi-mode optical fiber 10 of FIG. 1, which has a desirable complete orthonormal basis of propagating modes as already described. That is, the basis may only include propagating modes with a single radial intensity profile or substantially a single radial intensity profile for each angular momentum eigenvalue of a set. For example, the set may include the angular momentum eigenvalue(s) of lowest magnitude, the angular momentum eigenvalues of second lowest magnitude, the angular momentum eigenvalues of third lowest magnitude, and/or all of the angular momentum eigenvalues. The optical fiber may be constructed to not have such desirable properties, e.g., by constructing the inner radius and/or outer radius of the tubular optical core to have appropriate values.

The method 30 includes forming a core cylinder of a first material for an inner optical cladding (step 32). For example, the material for the core cylinder may include conventional undoped or germanium, hydrogen, and/or deuterium material(s) for forming a silica glass optical preform rod.

The method 30 includes forming a first tube of a second material for a tubular optical core (step 34). For example, the first tube may include undoped or germanium, hydrogen, or deuterium doped material(s) for a silica glass preform tube.

The method 30 includes forming a second tube of the first material or of a different third material for an outer optical cladding (step 36). For example, the second tube may include undoped or germanium, hydrogen, or deuterium doped material(s) for a silica glass preform tube.

The method 30 includes positioning the core cylinder in first tube and positioning the first tube in the second tube and then, congealing the core and first and second tubes, e.g., in a furnace, to form a cylindrical glass preform having a selected radial refractive index profile (step 38). The congealing step 38 forms an optical preform in which the cylindrical central region has a low refractive index, $n_{IOC}$, the first tubular region around the cylinder central region has a high refractive index, $n_C$, and the second tubular region around the first tubular region has a low refractive index, $n_{OOC}$, i.e., $n_{IOC} < n_C$ and $n_{OOC} < n_C$ as previously stated.

The method 30 also includes drawing a multi-mode optical fiber from the optical preform produced at the step 38 (step 40). The drawing may be performed by placing one end of the preform in a conventional fiber-drawing tower that gradually melting the end surface of the preform so that an optical fiber can be pulled from the melted portion of the preform. In particular, the radial index profile in the pulled optical fiber corresponds to the radial index profile in the preform whose end is gradually and/or uniformly melted to produce the material for drawing the optical fiber. The optical fiber may or may not be twisted during fiber drawing in order to mitigate polarization mode dispersion within a given azimuthal and radial mode.

In various embodiments, the method 30 produces an optical fiber that is one of the special examples of the multi-mode optical fibers 10 illustrated by FIGS. 1, 2A-2C, 3A-3C, and/or 4A-4C.

Figure 7:
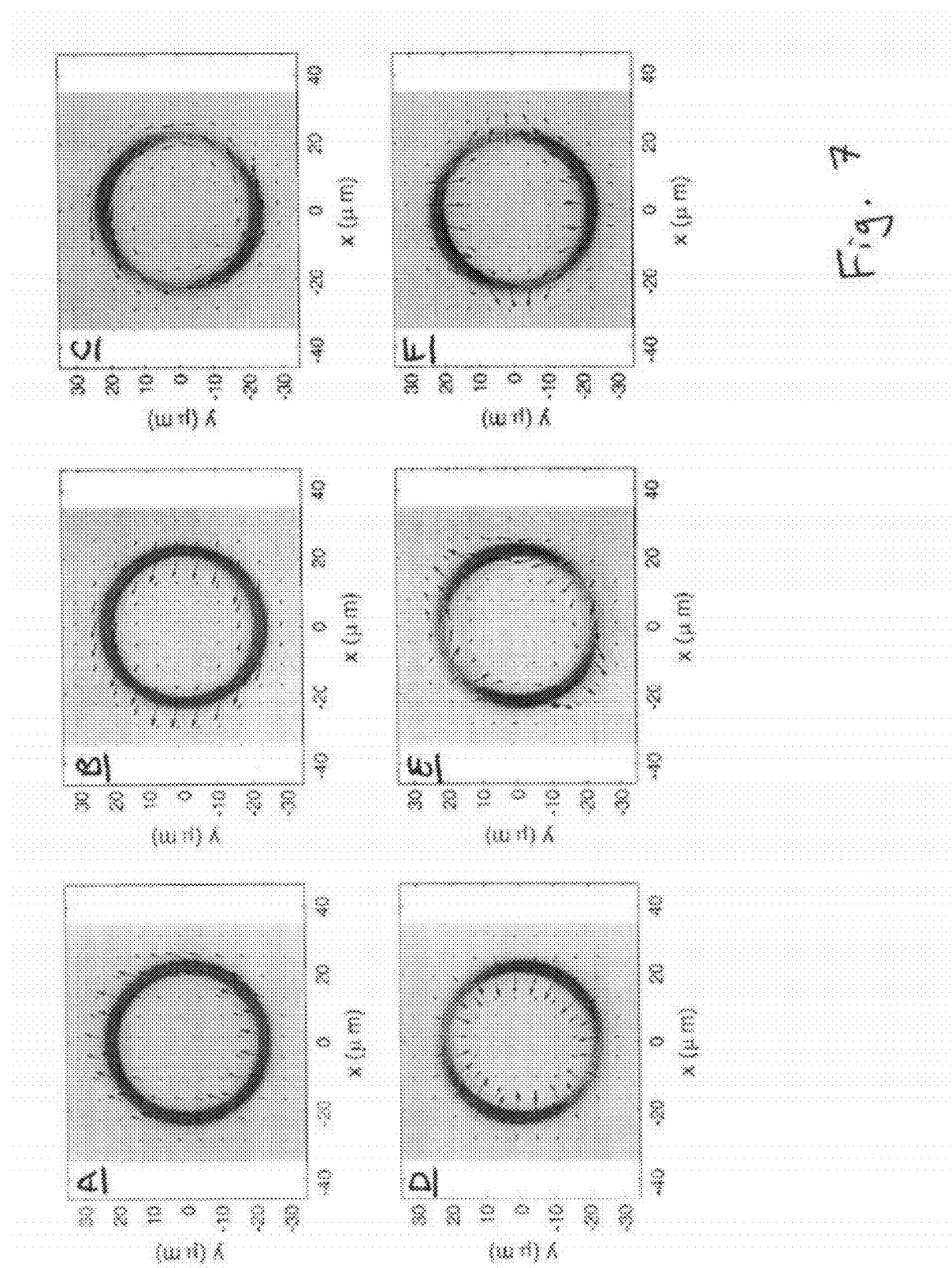
FIG. 7 schematically illustrates profiles of the electric field's magnitude and projected direction for some of the propagating modes in another example of the optical fiber with a tubular core as illustrated in FIG. 1.

FIGS. 9A-9B schematically illustrate an optical coupler 50 that may be used to end-couple to the multi-mode optical fiber 10 of FIG. 1, e.g., to the specific examples already discussed. In particular, the optical coupler 50 may selectively couple such light to individual ones of the propagating modes of the multi-mode optical fiber or to pairs of such modes in which the fields are related by a fixed polarization rotation, e.g., as illustrated in FIG. 7, plates A and B, plates C and D, or plates E and F.

The optical coupler 50 includes a plurality of N planar optical waveguides $52_1$, $52_2$, $52_3$, $52_4$, . . . , $52_N$; a planar optical grating 54; a 1×N optical power splitter or combiner 56; and optionally includes an optical data modulator or demodulator 58. The components $52_1$-$52_N$, 54, 56, and 58 may be integrated on a surface 60 of a single substrate or may be located on multiple substrates.

Each optical waveguide $52_1$-$52_N$ has a first end located at and optically connected to a corresponding one of the N optical second ports of the 1×N optical power splitter or combiner 56 and has a second end located along the lateral periphery of the planar optical grating 54. The second ends of the optical waveguides $52_1$-$52_N$ may be distributed at equal or unequal distances along the lateral periphery of the planar optical grating 54. In some other embodiments, each of the optical waveguides $52_1$-$52_N$ may be replaced by a closely spaced group of planar optical waveguides.

The planar optical grating 54 has a regular pattern of features (f), which are symmetrically positioned about the center of the planar optical grating 54. The features f may form a concentric set of regular and regularly spaced polygons (not shown) about the center of the planar optical grating 54. Alternately, the features f may form a set of concentric and regularly spaced circles (as shown) about the center of the planar optical grating 54. The features f form a regular pattern that diffracts light received from the second ends of the optical waveguides $52_1$-$52_N$, to the end of the multi-mode optical fiber 10 and/or diffracts light received from the adjacent end of the multi-mode optical fiber 10, to the second ends of the optical waveguides $52_1$-$52_N$. The center of the planar optical grating 54 is typically effectively laterally aligned with the center of the end of the multi-mode optical fiber 10, which is end-coupled thereto as shown in FIG. 9B.

In some embodiments, the optical power splitter or combiner 56 may power-split a light beam received at an optical first port 62, e.g., a digital data-modulated light beam from the optical modulator or demodulator 58, and redirects a portion of the received light beam into each of the N optical waveguides 52₁-52ₙ. The optical power splitter or combiner 56 may direct about equal or unequal portions of the received light beam to each of the N optical waveguides 52₁-52ₙ. In some such embodiments, the optical power splitter or combiner 56 may, e.g., perform such an optical splitting function in an optical transmitter.

In other embodiments, the optical power splitter or combiner 56 may interfere light received from the first ends of the optical waveguides 52₁-52ₙ, to produce an outgoing light beam at the optical first port 62, e.g., a light beam directed to the optical modulator or demodulator 58. In some such embodiments, the optical power splitter or combiner 56 may, e.g., perform such an optical combining function in an optical receiver.

The optional optical data modulator or demodulator 58 may modulate a digital data stream onto an optical carrier and output the modulated optical carrier to the optical first port 62 of the optical power splitter or combiner 56, e.g., in an optical transmitter.

Alternately, the optional optical data modulator or demodulator 58 may demodulate a digital data stream from a data-modulated optical carrier received from the optical first port 62 of the optical power splitter or combiner 56, e.g., in an optical receiver.

In the various embodiments, the optical power splitter or combiner 56, the optical waveguides 52₁-52ₙ, and the planar optical grating 54 function together as a matched optical filter. In particular, these components 56, 52₁-52ₙ, 54 form N parallel optical paths between the optical first port 62 of the optical power splitter or combiner 56 and the end of the multi-mode optical fiber 10 located adjacent to the planar optical grating 54.

In various embodiments, the effective optical path lengths of the N parallel optical paths are configured to provide a selected coupling between the optical first port 62 of the optical power splitter or combiner 16 and the propagating modes of the optical fiber 10. In particular, the effective optical path lengths of the N parallel optical paths fix the optical coupling between the optical first port 62 and the individual propagating modes of the multi-mode optical waveguide 10. The relative phases introduced by differences in the effective optical path lengths of the N parallel optical paths determine the optical couplings with the various propagating modes of the optical fiber 10.

Here, the effective optical path length of an optical waveguide is the equivalent optical path length for light propagating in the optical waveguide, which may be mode dependent. In the optical waveguide, light samples the refractive indexes of optical core and optical cladding and thus, propagates as if the optical waveguide has an effective optical index. The effective optical path length of an optical waveguide is the optical path length as determined by the effective refractive index of the optical waveguide.

In one example embodiment, optical attenuation between the adjacent end of the optical waveguide 10 and the optical first port 62 is about the same for light traversing any of the individual optical waveguides 52₁-52ₙ. Also, the second ends of the optical waveguides 52₁-52ₙ are spaced at equal angular separations around the center of the planar optical grating 54, which is itself laterally aligned with the center of the optical fiber 10. In this embodiment, the coupling of the optical first port 62 to a propagating mode of the multi-mode optical fiber 10 with the angular momentum "m" and the angular moment eigenfunction $e^{im\phi}$ is given by:

$$C\sum_{n=1}^{n=N} e^{-i2mn\pi/N} e^{iPh(n)}.$$

Here, $C\,e^{iPh(n)}$ is the optical channel matrix of the n-th optical path in the set of N parallel optical paths between the optical first port 62 and the adjacent end of the multi-mode optical fiber 10, and C and Ph(n) are the magnitude and phase of the channel matrix, i.e., the phases {Ph(n)} of the channel matrices depend on the specific optical path. In one example, if the k-th optical path in the set of N paths has a channel matrix C $e^{i2mk\pi/N}$ for all k in [1, N], then the optical first port 62 will only significantly optically couple to the propagating mode of the multi-mode optical fiber 10 whose angular momentum is m. Nevertheless, in other embodiments, the N optical paths may be configured to have channel matrices defining another set of phases {Ph(1), Ph(2), . . . , Ph(N)} and still produce an optical coupling only with the propagating mode with angular momentum "m".

Some embodiments of the optical coupler 50 of FIGS. 9A-9B may include features and/or structures and/or may be constructed and/or used with methods described for optical couplers of the above-incorporated U.S. patent applications.

Figure 10:
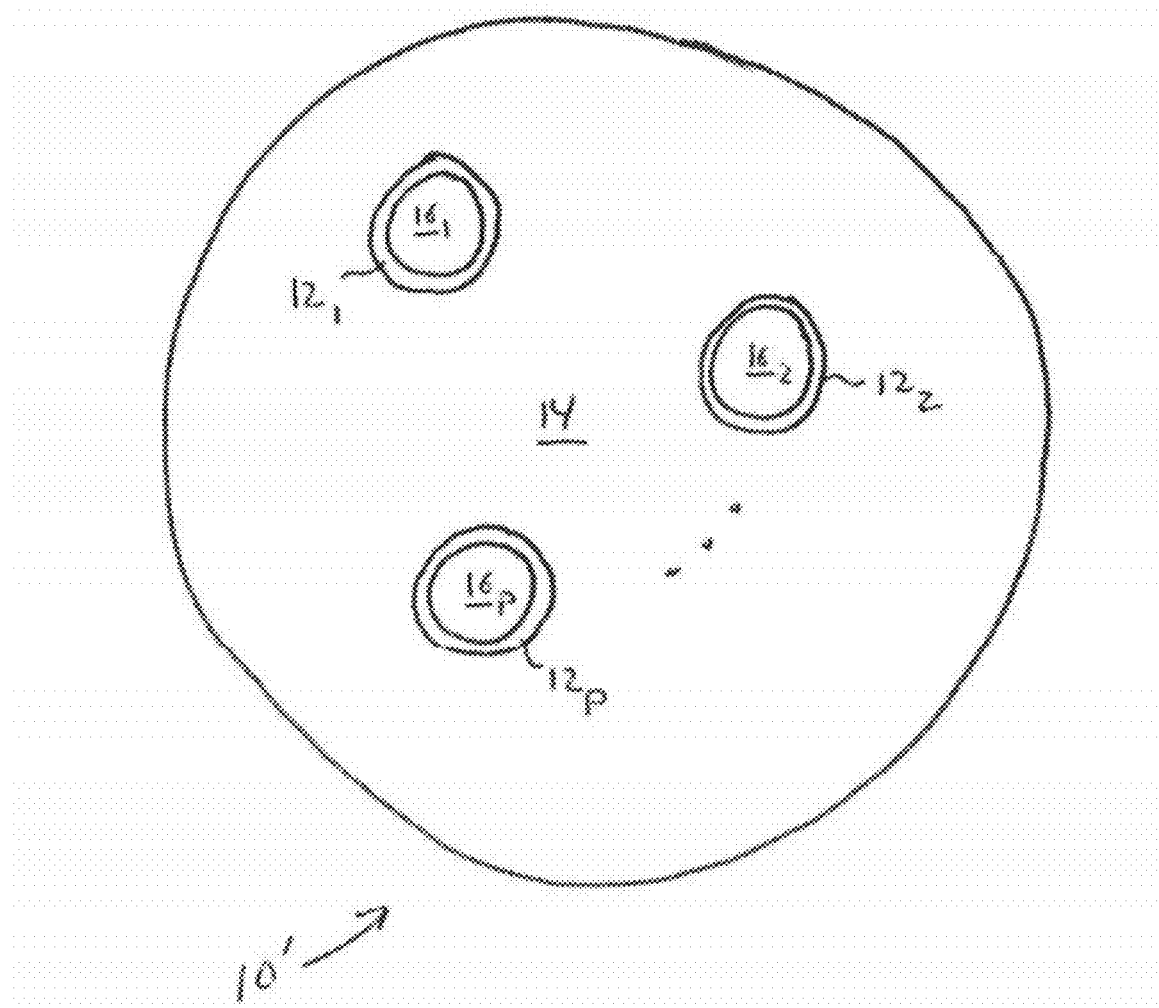
FIG. 10 is a cross-sectional view of an embodiment of a multi-core optical fiber in which the various optical cores are tubular optical cores.

FIG. 10 illustrates a multi-core optical fiber 10' that includes an outer optical cladding 14 and P tubular optical cores 12₁, 12₂, . . . , 12ₚ distributed in the outer optical cladding 14. Here, P is an integer greater than 2, e.g., P may be 2, 3, 4, 5, 6, 7, 8, 9, 10, . . . . Individual ones of the tubular optical cores 12₁-12ₚ may be filled by corresponding inner claddings 16₁, 16₂, . . . , 16ₚ or may be hollow. The tubular optical cores 12₁, 12₂, . . . , and 12ₚ have respective refractive indexes $n_{c1}, n_{c2}, \ldots,$ and $n_{cP}$ that are all larger than refractive index $n_{OOC}$ of the outer optical cladding 14. Also, the refractive index $n_{ck}$ of the k-th tubular optical core 12ₖ is larger than the refractive index $n_{IOCk}$ of its inner optical cladding 14 when present. Finally, the optical fiber 10' has P separate sets of distinct propagating optical modes, where the propagating modes of the k-th set have their powers concentrated at and near the k-th tubular optical core 12ₖ, i.e., have less than 5% and often have less than 1% of the their optical power in the other tubular optical cores 12₁-12ₚ.

In the multi-core optical fiber 10', the individual tubular optical cores 12₁-12ₚ are laterally separated by substantial distances so that each tubular optical core 12₁-12ₚ and any nearby portions of the optical cladding 14, 16₁-16ₚ operates substantially as a separate multi-mode optical fiber, i.e., an embodiment of the optical fiber 10 of FIG. 1. Indeed, each propagating mode that is concentrated at and near one of the tubular optical cores 12₁-12ₚ does not have substantial optical power in any other of the tubular optical cores 12₁-12ₚ, e.g., less than 5% of the power in such a propagating mode and often less than 1% of the energy of such a mode is in another tubular optical core 12₁-12ₚ. Thus, each tubular optical core 12ₖ and the nearby optical cladding 14, 12ₖ forms an embodiment of the multi-mode-optical fiber 10 of FIG. 1. The individual tubular optical cores may have any of the refractive index profiles illustrated in FIGS. 2A-2C, 3A-3C, and 4A-4C, and each tubular optical core 12₁-12ₚ may be used with the optical coupler 50 of FIGS. 9A-9B.

The multi-core optical fiber 10' of FIG. 10 may be produced from P optical preforms made according to the method 30 of FIG. 8. Each of the P optical preforms is, e.g., suitable for drawing a multi-mode optical fiber with one tubular optical core. The P preforms are stacked next to each other and consolidated, in a furnace, to produce a single optical preform with multiple tubular cores therein. The multi-core fiber 10' of FIG. 10 may be formed by drawing an optical fiber from this preform by conventional methods.

Also, the multi-core optical fiber 10' of FIG. 10 may be made by the method 40 of U.S. provisional application 61/433,437, filed Jan. 17, 2011, by Peter J. Winzer, if the preforms of step 42 therein are replaced by preforms produced at step 38 of the method 30 described in this application. The provisional application of Peter J. Winzer, which is mentioned in this paragraph, is also incorporated herein by reference in its entirety.

Other methods and/or structures for simultaneously coupling data modulated optical carriers to different linearly independent sets of propagating optical modes of a multi-mode optical waveguide may be, e.g., described in one or more of U.S. provisional patent application 61/428,154, filed by Christopher Doerr and Peter Winzer on Dec. 29, 2010; U.S. patent application Ser. No. 12/827,641, filed by Rene'-Jean Essiambre et al, on Jun. 30, 2010; U.S. patent application publication 20100329671; and U.S. patent application publication 2010329670, which are all incorporated herein by reference in their entirety. Some of the methods and/or structures, which are described in the documents mentioned in this paragraph, may be suitable to connect one or more optical data modulators or demodulators, e.g., component(s) 58 of FIGS. 9A-9B, to the multi-mode optical fiber 10 of FIG. 1 or 9B and/or to the individual tubular optical cores $12_1$-$12_N$ of the multi-core optical waveguide 10' of FIG. 10.

From the disclosure, drawings, and claims, other embodiments of the invention will be apparent to those skilled in the art.

What is claimed is:

1. An apparatus, comprising:
    an optical fiber having a tubular optical core for which a complete orthogonal basis of propagating modes at an optical telecommunication frequency includes ones of the propagating modes with different angular momenta, the optical fiber having an outer optical cladding in contact with and surrounding the tubular optical core, the tubular optical core having a larger refractive index than the optical cladding; and
    wherein the tubular optical core is configured such that those of the propagating modes with angular momenta of the lowest magnitude have a single group velocity, those of the propagating modes with angular momenta of the second lowest magnitude have a single group velocity, and those of the propagating modes with angular momenta of the third lowest magnitude have a single group velocity.

2. The apparatus of claim 1, further comprising an inner optical cladding filling the tubular optical core and having a refractive index smaller than the refractive index of the tubular optical core.

3. The apparatus of claim 1, wherein the tubular optical core has a refractive index that radially varies over at least part of the tubular optical core.

4. The apparatus of claim 1, wherein the tubular optical core is configured such that for each specific magnitude of the angular momenta, those of the propagating modes with angular momenta of the specific magnitude have the same group velocity.

5. The apparatus of claim 1, further comprising:
    an optical splitter or combiner optically connecting an optical first port thereof to N optical second ports thereof;
    a planar optical grating; and
    N optical waveguides, each optical waveguide having a first end located near and optically connecting to a corresponding one of the optical second ports and having a second end located near the planar optical grating, the planar optical grating being configured to diffract light between an end of the optical fiber and the second ends of the optical waveguides.

6. The apparatus of claim 5, wherein the optical first port substantially only optically couples to some of the propagating modes, the some of the propagating modes having angular momenta of the same value.

7. The apparatus of claim 6, wherein, about 90% or more of the optical power communicated between the optical first port and the optical fiber is communicated between the optical first port and the some of the propagating modes.

8. The apparatus of claim 1, wherein the optical fiber includes a second tubular optical core being located in the outer optical cladding and being configured such that propagating modes of the second core with angular momenta of the lowest magnitude for the second optical core have a single group velocity, propagating modes of the second core with angular momenta of the second lowest magnitude for the second optical core have a single group velocity, and propagating modes of the second core with angular momenta of the third lowest magnitude for the second optical core have a single group velocity.

9. An apparatus, comprising:
    an optical fiber having a tubular optical core and for which a complete orthogonal basis of propagating modes around the core at an optical telecommunication frequency includes ones of the propagating modes with different angular momenta, the optical fiber having an outer optical cladding in contact with and surrounding the tubular optical core, the tubular optical core having a larger refractive index than the optical cladding; and
    wherein the tubular optical core is configured such that those of the propagating modes whose angular momenta have the lowest magnitude for the propagating modes have substantially the same radial intensity profile.

10. The apparatus of claim 9,
    wherein the magnitudes of the angular momenta include two or more different values; and
    wherein the tubular optical core is configured such that those of the propagating modes with one of the angular momenta of the second lowest of the magnitudes have substantially the same radial intensity profile.

11. The apparatus of claim 10, wherein the tubular optical core is configured such that those of the propagating modes with one of the angular momenta of the third lowest of the magnitudes have substantially the same radial intensity profile.

12. The apparatus of claim 11, further comprising an inner optical cladding filling the tubular optical core and having a refractive index smaller than the refractive index of the tubular optical core.

13. The apparatus of claim 9, wherein the magnitudes of the angular momenta include two or more different values; and
    wherein the tubular optical core is configured such that for each particular one of the values, those of the propagating modes whose angular momenta have magnitudes of the particular one of the values have substantially the same radial intensity profile.

14. The apparatus of claim 9, wherein the tubular core has an average refractive index $n_c$ and the refractive index of the optical cladding has a value $n_{OC}$, and a value of the outer radius of the tubular optical core minus the inner radius of the tubular optical core is less than $\lambda/[2([n_c]^2-[n_{OC}]^2)^{1/2}]$ where lambda is a wavelength in the optical fiber telecommunication L-band.

15. The apparatus of claim 9, further comprising:
an optical splitter or combiner optically connecting an optical first port thereof to N optical second ports thereof;
a planar optical grating; and
N optical waveguides, each optical waveguide having a first end located near and optically connecting to a corresponding one of the optical second ports and having a second end located near the planar optical grating, the planar optical grating being able to diffract light between an end of the optical fiber and the second ends of the optical waveguides.

16. The apparatus of claim 15, wherein the optical first port substantially only optically couples to some of the propagating modes, the some of the propagating modes having angular momenta of the same value.

17. The apparatus of claim 16, wherein about 90% or more of the optical power communicated between the optical first port and the optical fiber is communicated between the optical first port and the some of the propagating modes.

18. The apparatus of claim 16, further comprising an optical data modulator or demodulator configured either to demodulate a digital data stream from a modulated light beam received from the optical first port or to modulate an optical carrier with a digital data stream and transmit the modulated optical carrier to the optical first port.

19. The apparatus of claim 8, wherein the optical fiber has a second tubular optical core in the optical cladding and a complete orthogonal basis of propagating modes around the second tubular optical core at an optical telecommunication frequency includes ones of the propagating modes with different angular momenta; and
wherein the second tubular optical core is configured such that those of the propagating modes around the second tubular optical core whose angular momenta have the lowest magnitude for the propagating modes around the second tubular optical core have substantially the same radial intensity profile.

20. An apparatus, comprising:
a multi-mode optical fiber having a tubular optical core and an outer optical cladding in contact with and surrounding the tubular optical core, the tubular optical core having a larger refractive index than the optical cladding; and
wherein the tubular core has an average refractive index $n_c$ and the refractive index of the optical cladding has a value $n_{OC}$; and
wherein a value of the outer radius of the tubular optical core minus the inner radius of the tubular optical core is less than a wavelength in the optical fiber telecommunication L-band over $[2([n_c]^2-[n_{OC}]^2)^{1/2}]$.

21. The apparatus of claim 20, further comprising:
an optical splitter or combiner optically connecting an optical first port thereof to N optical second ports thereof;
a planar optical grating; and
N optical waveguides, each optical waveguide having a first end located near and connected to a corresponding one of the optical second ports and having a second end located near the planar optical grating, the planar optical grating being configured to diffract light between an end of the multi-mode optical fiber and the second ends of the optical waveguides.

22. The apparatus of claim 21, wherein a complete orthogonal basis of propagating modes of the multi-mode optical fiber at an optical telecommunication frequency includes ones of the propagating modes with different angular momenta; and
wherein the optical waveguides are constructed such that the optical first port substantially only optically couples to some of the propagating modes and the some of the propagating modes have angular momenta of the same value.

\* \* \* \* \*